3,527,730
STABILIZATION OF POLYMERS WITH ALKALI AND ALKALINE EARTH METAL SALTS
Samuel Howard Coulson, Disley, Stockport, Cheshire, and Allan King, Heald Green, Cheadle, Cheshire, England, assignors to Geigy Chemical Corporation, Ardsley, N.Y., a corporation of New York
No Drawing. Filed Dec. 27, 1966, Ser. No. 604,662
Claims priority, application Great Britain, Dec. 30, 1965, 55,165/65; Aug. 4, 1966, 34,963/66
Int. Cl. C08f 45/56, 45/62; C08d 27/70
U.S. Cl. 260—45.7                               8 Claims

ABSTRACT OF THE DISCLOSURE

The colour stability and rheological properties of thermoplastic resinous polymers derived from acrylonitrile, butadiene and styrene (particularly acrylonitrile/butadiene/styrene/terpolymer) are improved by incorporating into the polymer a small amount of a stable alkali metal or alkaline earth metal salt of an acid having a pK value (Bronsted) of from 3 to 14.

---

The present invention relates to novel thermo-plastic compositions of improved properties, and, in particular, to the treatment of polymers of acrylonitrile, butadiene and styrene to improve the colour stability and/or rheological properties thereof.

Thermoplastic resins have found wide application in the manufacture of compression and injection mouldings. However, the manufacture of mouldings necessitates subjecting the thermoplastic resin to elevated temperatures for a substantial period of time. The use of polymers derived from acrylonitrile, butadiene and styrene as mouldings is disadvantageous in that these polymers discolour on being processed as mouldings, and the degree of discolouration increases as the processing time is lengthened. The incorporation into the various polymers of acrylonitrile, butadiene and styrene of stabilisers such as recognised heat stabilisers and antioxidants has proved beneficial, but has not provided a satisfactory solution to the problem of discolouration on processing.

We have now found that the incorporation into polymers of acrylonitrile, butadiene and styrene of certain metal salts of weak acids unexpectedly inhibits the discolouration of the polymers during processing at an elevated temperature, or otherwise improves the rheological properties of the polymers as described in detail hereinafter.

According to the present invention, there is provided a process of treating polybutadiene, polystyrene or a co- or terpolymer of acrylonitrile, butadiene and styrene to improve the properties thereof which comprises incorporating into the said polymer a minor amount of a stable alkali metal or alkaline earth metal salt of an acid having a pK value (Bronsted) within the range of from 3.0 to about 14.0, sufficient to inhibit the discolouration of the polymer during subsequent processing.

The polymer treated according to the process of this invention may be, for instance homo-polystyrene, homopolybutadiene, an acrylonitrile/butadiene copolymer, an acrylonitrile/styrene copolymer or a styrene/butadiene copolymer, or a blend of two or more thereof. It is preferred however that the polymer used in the process of the invention is a terpolymer of acrylonitrile, butadiene and styrene. A preferred acrylonitrile/butadiene/styrene resin is one having a styrene:acrylonitrile ratio of from 80:20 to 70:30 by weight and a butadiene:styrene and acrylonitrile ratio of from 40:60 to 10:90 by weight.

Examples of acrylonitrile/butadiene/styrene resins which may be advantageously employed in the process of the invention include general purpose moulding resins, pipe extrusion resins, profile extrusion resins and sheet extrusion resins, for example, resins having a tensile strength at 73° F. at a straining rate of 0.2 inch per minute within the range of from 2,000 to 8,000 pounds per square inch and a specific gravity within the range of from 0.95 to 1.10, the tensile strength being determined according to A.S.T.M. D.638–61T and the specific gravity being determined using a compression moulded sample. Examples of preferred acrylonitrile/butadiene/styrene resins are "Cycolon DM" having a tensile strength of 6,900 pounds per square inch and a specific gravity of 1.05; "Cycolac T" having a tensile strength of 6,300 pounds per square inch and a specific gravity of 1.04; "Cycolac SF" having a tensile strength of 2,600 pounds per square inch and a specific gravity of 1.00; "Cycolac X7" having a tensile strength of 6,900 pounds per square inch and a specific gravity of 1.05; "Cycolac H" having a tensile strength of 4,700 pounds per square inch and a specific gravity of 1.02; "Blendex 401" having a tensile strength of 3,200 pounds per square inch and a specific gravity of 0.99; "Kralastic MH" having a tensile strength of 6,200 pounds per square inch and a specific gravity of 1.04; "Kralastic SR" having a tensile strength of 6,500 pounds per square inch and a specific gravity of 1.04; and "Kralastic K.2540" having a tensile strength of 4,400 pounds per square inch and a specific gravity of 1.01; the tensile strength in each case being determined at 73° F. at a straining rate of 0.2 inch per minute according to A.S.T.M. D. 638–61T, and the specific gravity being determined using a compression moulded sample.

The process of this invention is also effective in improving the properties of polystyrene polymers, particularly those polymers which possess a tensile strength at 73° F. at a straining rate of 0.2 inch per minute within the range of from 4,500 to 6,000 pounds per square inch, and have a specific gravity within the range of from 1.04 to 1.06.

The polybutadiene polymers which may be treated according to the process of the present invention include stereospecific polymers, that is polymers obtained by solvent polymerisation techniques and having a high cis content.

Another important polymeric material which presents serious discolouration problems on processing is high impact polystyrene, consisting of a blend of polystyrene with a styrene/butadiene rubber. The proportion of the styrene/butadiene rubber in the blend is normally within the range of from 5% to 15% by weight. High impact polystyrene materials which are preferably treated in the process of this invention are those having a tensile strength at 73° F. at a straining rate of 0.2 inch per minute within the range of from 3,000 to 5,000 pounds per square inch, and a specific gravity within the range of from 1.04 to 1.06.

Alternatively, there may be treated by the process of the present invention an acrylonitrile/butadiene copolymer rubber having, for instance an acrylonitrile:butadiene ratio within the range of from 20:80 to 40:60 by weight; a styrene/butadiene copolymer rubber having, for example, a styrene:butadiene ratio of from 10:90 to 40:60 by weight; or a styrene/acrylonitrile copolymer rubber having, for instance, a styrene/acrylonitrile ratio within the range of from 85:15 to 60:40 by weight.

The alkali metal or alkaline earth metal salt of a weak acid which is employed in the process of the present invention may be the salt of a mono- or polybasic acid. The alkali metal radical is preferably sodium or potassium and the alkaline earth metal radical is preferably calcium or magnesium. Furthermore the salt used in the process of the invention is naturally desirably colourless or light in colour in order that the use of the salt itself shall not contribute in any material way to the discolouration of the treated polymer on processing.

The acid from which the salt is derived may be a weak organic or a weak inorganic acid, the acid having a pK value (Bronsted) within the range of from 3 to 14 at 25° C., however for the purpose of reducing the colour degradation of the polymer on processing the salt employed is more preferably derived from a weak acid having a pK value within the range of from 6 to 10 at 25° C.

Examples of the salts of weak organic acids which may be employed in the process of the invention include the mono-sodium, potassium, lithium, calcium or magnesium salts of acetic, propionic, n-butyric, iso-butyric, n-valeric, iso-valeric, n-hexanoic, n-heptanoic, n-octanoic, n-nonanoic, stearic, oleic, benzoic, naphthoic, phenylacetic, o-, m- and p-toluic acids; the di-sodium and potassium salts and the mono-calcium and magnesium salts of succinic, gluteric, adipic, pimelic, suberic, sebacic and o-phthalic acids; the di-sodium and di-potassium salts and the mono-calcium and magnesium salts of maleic and malonic acids; the di- and tri-sodium and tri-potassium salts of citric acid, the tetrasodium or tetra-potassium salt of the oxidation product of Bisphenol A, namely 4,6-dicarboxymethyl, 5,5-dimethyl azelaic acid described in U.S. patent application No. 502,470, filed Oct. 22, 1965. In addition, for instance, the corresponding sodium, potassium, calcium and magnesium salts of phenolic compounds having weak acid characteristics, for example phenol itself, o-, m- and p-cresols, 2,3-dichlorophenol and resorcinol may be employed in the process of the present invention.

However, the alkali metal or alkaline earth metal salts of weak organic acids which are most advantageously employed in the instant process are those derived from amino-substituted carboxylic acids. Examples of such preferred salts are the sodium and potassium N-alkanoyl-substituted sarcosinates, for instance sodium N-lauroyl sarcosinate, sodium N-oleoyl sarcosinate, potassium N-lauroyl sarcosinate and potassium N-oleoyl sarcosinate.

The alkali metal or alkaline earth metal salt of the alkylene polyamino polycarboxylic acid which may be employed in the process of the present invention may be a tri-, tetra-, penta- or higher metal salt. The alkali metal is preferably sodium or potassium and the alkaline earth metal is preferably calcium or magnesium. The alkylene polyamino polycarboxylic acid radical may be unsubstituted other than by amino groups or be further substituted, for instance, with one or more hydroxy imino or nitrilo groups. The alkylene polyamino polycarboxylic acid radical may be a cyclic compound or, preferably, an acyclic compound. Examples of alkali metal or alkaline earth metal salts of alkylene polyamino polycarboxylic acids which may be used in the process of the present invention include the tri- and tetra-sodium salts of ethylene diamine tetra-acetic acid, the tri- and tetra-potassium salts of ethylene diamine tetra-acetic acid, the di-calcium salts of ethylene diamine tetra-acetic acid, the di-magnesium salts of ethylene diamine tetra-acetic acid, the di-sodium calcium-, the di-sodium magnesium-, the di-potassium calcium and the di-potassium magnesium mixed salts of ethylene diamine tetra-acetic acid, the penta-sodium- or penta-potassium salts of diethylene tri-amine penta-acetic acid, the tri-sodium- and the tri-potassium salts of hydroxyethyl ethylene diamine tri-acetic acid, the tri-sodium and tri-potassium salts of hydroxybutyl ethylene diamine tri-acetic acid, the tetra-sodium- and tetra-potassium salts of cyclohexane diamine tetra-acetic acid, the tetra-sodium salt of diamino diethyl ether tetra-acetic acid, the tri-sodium salt of N-(2-hydroxy cyclohexyl) ethylene diamine triacetic acid and the di-sodium and di-potassium salts of glutamic and iminodiacetic acids.

The salts of weak inorganic acids which may be advantageously utilised in the process of the invention include, for instance, calcium and magnesium carbonate, the sodium, potassium, calcium and magnesium metaborates, o-silicates, stannates, aluminates, tungstates, sodium and potassium tetraborates, tetra-sodium and tetra-potassium pyrophosphates, di-sodium hydrogen o-phosphate, di-potassium hydrogen o-phosphate, tri-sodium o-phosphate, tri-potassium o-phosphate, and calcium o-phosphate.

The stable alkali or alkaline earth metal salt of a weak acid which is employed in the present process should desirably be thermally and oxidatively stable at the elevated temperatures which are employed during the processing of polymers derived from acrylonitrile, butadiene and styrene; that is the salt should preferably be thermally and oxidatively stable during processing of the polymer at temperatures up to 300° C. In addition the salt employed in the process of the present invention should not be unduly affected by trace amounts of acid or alkali, or form highly coloured complex derivatives with trace amounts of metallic impurities which may be present in the treated polymer.

The proportion of the alkali metal or alkaline earth metal salt which is employed in the present process is preferably within the range of from 0.05% to 5% by weight, more preferably within the range of from 0.2% to 2% by weight based on the weight of the polymer.

It is preferred that during the process of the invention, a minor proportion of an organic phosphite is also incorporated into the polymer. The incorporation of phosphite into the polymer is especially advantageous for increasing the colour stability of the treated polymer if the salt which is employed in the process of the invention is derived from a weak acid which is outside the preferred range of pK values, that is a pK value within the range of from 6 to 10. The incorporation of an organic phosphite together with a salt derived from an acid within the preferred pK value range is also advantageous although the degree of improvement in the properties of the polymer so treated is not as marked as when the phosphite is used together with a less preferred salt.

Suitable organic phosphites, for use in the present process include both aliphatic and aromatic phosphites, although tri-aryl phosphites, for instance tri-phenyl phosphite or tri-nonyl phenyl phosphite are preferred.

The process of the present invention is directed as one aspect to imparting colour stability to the specified polymers over a wide range of temperature. As a further aspect, the process of this invention is advantageous in maintaining the flow properties of the treated polymer during processing of the polymer at high temperatures. For this purpose, it is preferred to use one or more stable alkali metal or alkaline earth metal salts derived from a weak acid having a pK value within the range of from 10 to 14.

Certain grades of partially stabilised homo-, co- or ter-polymers of acrylonitrile, butadiene and styrene are believed to contain very small proportions of phosphite as stabiliser. However, these grades as a general rule contain not more than about 0.1% by weight of phosphite based on the total weight of the polymer. It is preferred that the proportion of organic phosphite which may be utilised in the process of the present invention is within the range of from 0.1% to 5% by weight, more preferably within the range of from 0.2% to 2% by weight based on the weight of the polymer.

Conventional additives are normally already present in polymers of acrylonitrile, butadiene and styrene but such additives may, if desired, be incorporated into the polymer during the process of the present invention. Conventional additives include, for instance, fillers, pigments and antioxidants or other stabilisers. If a filler is already present in the polymer or desired to be added to the polymer, it may be, for example, glass fibres or other reinforcing material. Inorganic or organic pigments may be present or added.

Antioxidants which may be present or incorporated are, for instance those of the hindered phenol type, such as butylated hydroxy-toluene or of the thioester type, such as dilauryl thiodipropionate.

The process of the present invention may be effected by any conventional method, for instance by milling the components on a two-roll mill, in a Banbury-type mixer at an elevated temperature, or in an extrusion process. The temperature at which the process of the present invention is effected may be varied within a relatively wide range depending on the method by which the process is carried out. However, if the process of the invention is effected using a milling procedure, the milling temperature is preferably within the range of from 130° C. to 200° C., more preferably within the range of from 140° C. to 180° C.

The present invention further provides a composition comprising polybutadiene, polystyrene or a co- or terpolymer of acrylonitrile, butadiene and styrene and a minor amount, as stabiliser, of an alkali metal or alkaline earth metal salt of an acid having a pK value (Bronsted) within the range of from 3 to 14.

The compositions produced by the process of the present invention have excellent colour stability over a wide range of temperatures. The compositions produced by the process of the present invention are particularly valuable for use in the production of coloured mouldings, since the pigmentation introduced into such mouldings is not masked by any substantial degree of discolouration of the polymer. By contrast, coloured mouldings produced from polymers not produced by the process of the present invention vary in shade from batch to batch due to the effect of the discolouration of the polymer.

The present invention is further illustrated by the following examples; parts and percentages shown therein are expressed by weight unless otherwise stated.

EXAMPLES 1 AND 2

100 parts of stabilised "Cycolac T," an acrylonitrile/butadiene/styrene terpolymer resin having a tensile strength at 73° F. at a strain rate of 0.2 inch per minute of 6,300 pounds per square inch (A.S.T.M. D.638–61T) and a specific gravity of 1.04, and 1.0 part of potassium tetraborate were blended on a two-roll mill for a period of 5 minutes. One roll of the mill was maintained at 140° C. and the other at 165° C.

For the purpose of comparison, 100 parts of the same resin were milled under the same conditions for the same time but without the addition of the potassium salt.

Samples of each of the hides so obtained were subsequently compression moulded in a steam-heated press at 180° C., to produce flat sheets 0.050 inch thick.

Samples from the two sheets so obtained were placed side by side between sheets of aluminium foil and compression moulded between steel plates in an electrically heated press at 250° C. for 30 minutes.

Comparisons between the hides and each of the moulded sheets so obtained showed that considerably more colour and flow deterioration had occurred in the moulded samples not containing the potassium tetraborate.

Very similar results were achieved when the potassium tetraborate in Example 1 was replaced by the same quantity of sodium tetraborate, the procedure described therein being substantially the same.

EXAMPLES 3 TO 10

The procedure described in Example 1 was repeated excepting that the "Cycolac T" used therein was replaced each time by one of the following polymers:

"Cycolon DM" having a tensile strength of 6,900 pounds per square inch and a specific gravity of 1.05;

"Cycolac SF" having a tensile strength of 2,600 pounds per square inch and a specific gravity of 1.00;

"Cycolac X7" having a tensile strength of 6,900 pounds per square inch and a specific gravity of 1.05;

"Cycolac H" having a tensile strength of 4,700 pounds per square inch and a specific gravity of 1.02;

"Blendex 401" having a tensile strength of 3,200 pounds per square inch and a specific gravity of 0.99;

"Kralastic MH" having a tensile strength of 6,200 pounds per square inch and a specific gravity of 1.04;

"Kralastic SR" having a tensile strength of 6,500 pounds per square inch and a specific gravity of 1.04;

"Kralastic K.2540" having a tensile strength of 4,400 pounds per square inch and a specific gravity of 1.01.

The tensile strength in each case being determined at 73° F. at a strain rate of 0.2 inch per minute according to A.S.T.M. D.638–61T, and the specific gravity being determined using a compression moulded sample.

Comparisons between the various samples so obtained clearly showed that considerably more yellowing had occurred in the samples not containing the potassium salt. Furthermore, the comparisons showed that the colour of the compositions produced according to the process of the invention did not deteriorate substantially with increasing time, in marked contrast to compositions not containing the potassium salt.

EXAMPLES 11 AND 12

100 parts of stabilised "Cyolac T" terpolymer resin and 1 part of sodium pyrophosphate were blended on a two-roll mill and subsequently compression moulded in the manner described in Example 1.

Again comparisons between the compositions so obtained and compositions containing no sodium pyrophosphate demonstrated that considerably more colour and flow deterioration had occured in the compositions not containing the pyrophosphate salt.

Similar results were obtained when sodium pyrophosample 1 was also repeated but replacing the potassium pyrophosphate, the remaining procedure being substantially the same.

EXAMPLES 13 AND 14

The procedure described in Example 1 was repeated except that the potassium tetraborate used therein was replaced by 1 part of pentasodium diethylenetriamine penta-acetate.

For the purpose of comparison, the procedure in Example 1 was also repeated but replacing the potassium tetraborate with 1 part of diethylenetriamine penta-acetic acid.

100 parts of stabilised "Abstrene 334" acrylonitrile/butadiene/styrene terpolymer resin having a tensile strength at 73° F. at a strain rate of 0.2 inch per minute of 7,000–8,500 pounds per square inch (A.S.T.M. D.638–61T) and a specific gravity of 1.04, and 1.0 part of pentasodium diethylenetriamine penta-acetate were blended and moulded in the manner described in Example 1.

For the purpose of comparison, samples of the same resin and of the same resin but containing 1.0 part of the corresponding free acid instead of the pentasodium diethylenetriamine penta-acetate were treated as illustrated in Example 1.

The results obtained in Examples 13 and 14 and also Examples 1, 2, 11 and 12 are summarised in the following Table I.

The flow data were obtained according to the procedure described in A.S.T.M. D.1238–62T. A sample from a compression moulded sheet (0.050 inch thick) of the resin under test was cut into small pieces and 5 grams of the resin charged into a cylinder which was subsequently heated to 250° C. The piston carrying a 5 kilogram load was applied to the cylinder which carried at its base a small die of 0.0465 inch bore. The material extruded through the die was cut off at intervals between 5 and 6 minutes (initial sample) and 30 and 31 minutes (aged sample), from the application of initial pressure; the specimens so obtained were then weighed.

The data obtained in this way are expressed in decigrams per minute.

In addition Table I contains a numerical colour assessment of each composition described therein. The colour assessment was made visually according to the following scheme:

| Number: | Colour |
|---|---|
| 1 | Pale Cream. |
| 2 | Mid Cream. |
| 3 | Dark Cream. |
| 4 | Pale Buff. |
| 5 | Mid Buff. |
| 6 | Dark Buff. |
| 7 | Pale Yellow/Brown. |
| 8 | Mid Yellow/Brown. |
| 9 | Dark Yellow/Brown. |
| 10 | Pale Brown. |
| 11 | Mid Brown. |
| 12 | Dark Brown. |
| 13 | Black. | triphenyl phosphite, respectively, were each blended and moulded in the manner described in Example 1.

For the purposes of comparison, samples from compositions consisting of resin alone and of resin mixed with 1.0 part of triphenyl phosphite were also prepared in identical manner.

The results obtained are shown in Table II below:

TABLE II

| Example: | Resin | Additive | pK value of acid radical | Flow Initial | Flow After ageing | Colour Initial | Colour After ageing |
|---|---|---|---|---|---|---|---|
| 15 | Partially stabilised "Cycolac T" | Potassium pyrophosphate | 8.2 | 1.35 | 0.70 | 1 | 1 |
| 16 | do | Potassium pyrophosphate plus triphenyl phosphite | 8.2 | 1.40 | 0.70 | 1 | 3 |
| 17 | do | Pentasodium diethylenetriamine penta-acetate | 10.4 | 1.75 | 1.0 | 1 | 5 |
| 18 | do | Pentasodium diethylenetriamine penta-acetate plus triphenyl phosphite. | 10.4 | 2.1 | 1.2 | 1 | 3 |
|  | do | None | | 1.30 | 0.15 | 1 | 8 |
|  | do | Triphenyl phosphite | | 1.05 | 0.16 | 1 | 8 |

The results shown in the foregoing table help to demonstrate the unexpected superiority of the compositions produced by the process of the invention when compared with related compositions.

EXAMPLES 19 TO 21

Compositions produced from 100 parts of partially stabilised "Cycolac T" and 1.0 part of sodium metaborate, and from 100 parts of stabilised "Cycolac T," 1.0 part of sodium metaborate and 1.0 part of triphenyl phosphite were blended and moulded in the manner described in Example 1.

In addition a similar composition consisting of 100 parts of stabilised "Cycolac T" and 1.0 part of sodium metaborate was prepared from stabilised "Cycolac T."

TABLE I

| Example: | Resin | Additive | pK value of acid radical | Flow Initial | Flow After ageing | Colour Initial | Colour After ageing |
|---|---|---|---|---|---|---|---|
|  | Stabilised "Cycolac T" | None | | 0.97 | 0.11 | 1 | 8 |
| 1 | do | Potassium tetraborate | 9.0 | 1.65 | 0.95 | 1 | 3 |
| 2 | do | Sodium tetraborate | 9.0 | 1.55 | 0.70 | 1 | 4 |
| 11 | do | Sodium pyrophosphate | 8.2 | 1.40 | 0.70 | 1 | 3 |
| 12 | do | Potassium pyrophosphate | 8.2 | 1.70 | 0.90 | 1 | 4 |
| 13 | do | Pentasodium diethylenetriamine penta-acetate | 10.4 | 1.70 | 1.50 | 1 | 4 |
|  | do | Diethylenetriamine penta-acetic acid | 10.4 | 1.80 | 0.30 | 1 | 8 |
|  | Stabilised "Abstrene 334" | None | | 0.90 | 0.25 | 1 | 4 |
| 14 | do | Pentasodium diethylenetriamine penta-acetate | 10.4 | 0.70 | 0.50 | 1 | 2 |
|  | do | Diethylenetriamine penta-acetic acid | 10.4 | 0.45 | 0.15 | 1 | 4 |

These results clearly show the superior colour and flow properties of the compositions produced by the process of the present invention especially when compared with the closely related compositions outside the scope of the invention.

EXAMPLES 15 TO 18

Compositions prepared from 100 parts of partially stabilised (compounded) "Cycolac T" resin and 1.0 part of potassium pyrophosphate, from 100 parts of partially stabilised "Cycolac T," 1.0 part of potassium pyrophosphate and 1.0 part of triphenyl phosphite, from 100 parts of partially stabilized "Cycolac T" and 1.0 part of pentasodium diethylenetriamine penta-acetate, and from 100 parts of partially stabilised "Cycolac T," 1.0 part of pentasodium diethylenetriamine penta-acetate and 1.0 part of The properties of each of the compositions so produced are summarised in the following Table III:

TABLE III

| Example: | Resin | Additive | pK value of acid radical | Flow Initial | Flow After ageing | Colour Initial | Colour After ageing |
|---|---|---|---|---|---|---|---|
|  | Partially stabilised "Cycolac T" | None | | 1.30 | 0.15 | 1 | 8 |
| 19 | do | Sodium metaborate | 13.8 | 1.80 | 1.35 | 3 | 8 |
|  | do | Triphenyl phosphite | | 1.05 | 0.16 | 1 | 9 |
| 20 | do | Sodium metaborate plus triphenyl phosphite | 13.8 | 1.80 | 1.0 | 1 | 6 |
|  | Stabilised "Cycolac T" | None | | 0.97 | 0.11 | 1 | 8 |
| 21 | do | Sodium metaborate | 13.8 | 1.70 | 1.55 | 1 | 6 |

The results in Table III show well the excellent flow properties of certain compositions produced by less preferred embodiments of the present invention; the improved colour properties of these compositions compared with compositions outside the scope of the invention are also demonstrated.

EXAMPLES 22 AND 23

Compositions consisting of 100 parts of stabilised "Cycolac T" and 1.0 part of trisodium orthophosphate, disodium hydrogen o-phosphate or sodium dihydrogen o-phosphate were blended and moulded as described in Example 1.

For comparative purposes, a similar composition was prepared by replacing the alkali metal phosphates by triphenyl phosphate.

The properties of the samples thus produced are set out in Table IV below:

TABLE IV

| Resin | Additive | pK value of acid radical | Flow | | Colour | |
|---|---|---|---|---|---|---|
| | | | Initial | After ageing | Initial | After ageing |
| Example: | | | | | | |
| | Stabilised "Cycolac T" | None | | 0.97 | 0.11 | 1 | 8 |
| 22 | do | Trisodium o-phosphate | 12.7 | 1.75 | 1.30 | 1 | 6 |
| 23 | do | Disodium hydrogen o-phosphate | 7.2 | 1.60 | 0.80 | 1 | 4 |
| | do | Sodium dihydrogen o-phosphate | 2.2 | 1.40 | 0.50 | 1 | 7 |
| | do | Triphenyl o-phosphate | | 1.20 | 0.20 | 1 | 8 |

The data in Table IV all relating to derivatives of o-phosphoric acid illustrate well the marked improvement produced by a preferred embodiment of the present invention, that is the incorporation into an acrylonitrile/butadiene/styrene terpolymer resin of an alkali metal salt of an acid having a pK value within the range of from 6 to 10. The data of Example 22 relating to a less preferred embodiment of the present invention demonstrates the improved properties especially flow of the treated resin compared with untreated resin.

EXAMPLE 24

100 parts of stabilised "Cycolac T" and 1.0 part disodium phthalate were blended and moulded according to the procedure described in Example 1.

The same amount of stabilised "Cycolac T" was also blended and moulded with 1.0 part of potassium hydrogen phthalate and 1.0 of o-phthalic acid respectively in order to provide comparative data. The test results obtained are shown in Table V:

TABLE V

| Resin | Additive | pK value of acid radical | Flow | | Colour | |
|---|---|---|---|---|---|---|
| | | | Initial | After ageing | Initial | After ageing |
| Example: | | | | | | |
| | Stabilised "Cycolac T" | None | | 0.97 | 0.11 | 1 | 8 |
| 24 | do | Disodium phthalate | 5.2 | 1.50 | 0.60 | 1 | 5 |
| | do | Potassium hydrogen phthalate | 2.9 | 1.40 | 0.40 | 1 | 9 |
| | do | o-Phthalic acid | 5.2 | 1.10 | 0.10 | 1 | 9 |

The data in Table V show conclusively the surprising superiority especially in respect of colour properties of the composition produced by the process of the invention when compared with closely related compositions.

EXAMPLE 25

100 parts of stabilised "Cycolac T" and 1.0 part of disodium sebacate were blended and moulded in the manner described in Example 1. Similar compositions were prepared in the same way but replacing the disodium sebacate with the same amount of dioctyl sebacate and sebacic acid respectively, in order to obtain data for comparative purposes.

The test results obtained as summarised in the following Table VI:

TABLE VI

| Ex. | Resin | Additive | pK value of acid radical | Flow | | Colour | |
|---|---|---|---|---|---|---|---|
| | | | | Initial | After ageing | Initial | After ageing |
| | Stabilised "Cycolac T" | None | | 0.97 | 0.11 | 1 | 8 |
| 25 | do | Disodium sebacate | 5.6 | 1.5 | 0.6 | 1 | 5 |
| | do | Dioctyl sebacate | 5.6 | 0.97 | 0.11 | 1 | 8 |
| | do | Sebacic acid | 5.6 | 1.0 | 0 | 1 | 8 |

These data demonstrate the criticality of employing an alkali metal salt of an acid in the process of the invention rather than the free acid or an ester thereof in order to achieve the desired improvement in properties of the treated resin.

EXAMPLES 26 TO 33

100 parts of stabilized "Cycolac T" and 1.0 part of one of each of the following salts were blended and moulded in the manner described in Example 1.

disodium iminodiacetic acid
disodium maleate
sodium glycollate
sodium ortho silicate
sodium meta silicate
trisodium citrate
the tetra sodium of the tetracarboxylic acid obtained by the oxidation of Bisphenol A, i.e.

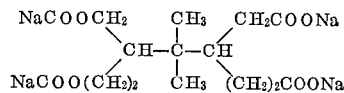

sodium phenate.

The test data obtained are summarized in Table VII:

TABLE VII

| | Additive | pK value of acid radical | Flow | | Colour | |
|---|---|---|---|---|---|---|
| | | | Initial | After ageing | Initial | After ageing |
| Example: | | | | | | |
| | None | | 0.97 | 0.11 | 1 | 8 |
| 26 | Sodium metasilicate | 12.0 | 2.13 | 2.01 | 1 | 6 |
| 27 | Sodium silicate | 11.0 | 1.56 | 1.07 | 1 | 4 |
| 28 | Sodium phenate | 10.0 | 1.80 | 1.68 | 1 | 5 |
| 29 | Disodium iminodiacetic acid | 9.2 | 1.55 | 1.40 | 4 | 3 |
| 30 | Sodium citrate | 6.4 | 1.58 | 0.88 | 1 | 5 |
| 31 | Sodium maleate | 6.1 | 1.34 | 0.84 | 1 | 3 |
| 32 | Tetrasodium salt of oxidation product of bisphenol A | 6.0 | 1.30 | 0.63 | 1 | 4 |
| 33 | Sodium glycollate | 3.7 | 1.36 | 0.66 | 1 | 3 |
| | Dibutyl tin maleate | 6.1 | 1.21 | 0.59 | 1 | 10 |
| | Sodium chloroacetate | 2.8 | 1.17 | 0.15 | 1 | 8 |

These results constituted further evidence of the surprising advantage derived from the use of the specified salts in the process of this invention compared with the use of related salts.

EXAMPLES 34 TO 38

100 parts of an acrylonitrile/butadiene copolymer rubber having an acrylonitrile:butadiene ratio of 30:70 were cold milled with 1.0 part of one of each of the following salts on a two-roll mill:

disodium iminodiacetate
sodium tetraborate
sodium pyrophosphate
the tetrasodium salt of the tetracarboxylic acid obtained by the oxidation of Bisphenol A
sodium salicylate 1 inch square samples were cut from each of the milled sheets so obtained and were placed in an oven maintained at 150° C. The colour of each sample during the heat-ageing was noted at various intervals and the results obtained are shown in the following Table VIII:

TABLE VIII

| Additive | | pK value of acid radical | Colour of sample | | |
|---|---|---|---|---|---|
| | | | Initial | After 1 hour | After 8 hours |
| Example: | | | | | |
| | None | | 1 | 5 | 11 |
| 34 | Disodium iminodiacetate | 9.2 | 1 | 2 | 6 |
| 35 | Sodium tetraborate | 9.0 | 1 | 3 | 8 |
| 36 | Sodium pyrophosphate | 8.2 | 1 | 3 | 7 |
| 37 | The tetradosium salt of tetracarboxylic acid oxidation product of bisphenol A | 6.0 | 1 | 3 | 8 |
| 38 | Sodium salicylate | 3.0 | 1 | 4 | 9 |

These results confirm the effectiveness of the use of the specified metal salts in substantially reducing the colour deterioration of nitrile rubbers on heat ageing.

EXAMPLES 39 TO 42

100 parts of a styrene:butadiene rubber having a styrene to butadiene content of 25:75 were cold milled with 1.0 part of one of each of the following salts on a two-roll mill:

disodium iminodiacetate
sodium pyrophosphate
the tetrasodium salt of the tetracarboxylic acid obtained by the oxidation of Bisphenol A sodium salicylate.

1 inch square samples were cut from each of the milled sheets and heat-aged in an oven at 150° C. The colour of each of the heat-aged samples was noted initially and after 16 hours ageing, the results being shown in the following Table IX:

TABLE IX

| Additive | | pK value of acid radical | Colour of sample | |
|---|---|---|---|---|
| | | | Initial | 16 hours |
| Example: | | | | |
| | None | | 1 | 10 |
| 39 | Disodium iminodiacetate | 9.2 | 1 | 8 |
| 40 | Sodium pyrophosphate | 8.2 | 1 | 7 |
| 41 | Tetrasodium salt from oxidised bisphenol A | 6.0 | 1 | 7 |
| 42 | Sodium salicylate | 3.0 | 1 | 7 |

Substantial improvement was noted in the colour stability of a styrene:butadiene rubber in heat ageing after treatment by the process of the invention.

EXAMPLE 43

100 parts of "Cycolon D.M." having a tensile strength at 73° F. at a rate of 0.2 inch per minute of 6,900 pounds per square inch (A.S.T.M. D.638–61T) and a specific gravity of 1.05, and 1 part of calcium di-sodium ethylenediamine tetra-acetate were blended on a two-roll mill for a period of 5 minutes. One roll of the mill was maintained at 140° C. and the other at 165° C.

For the purpose of comparison 100 parts of the same resin were milled under the same conditions for the same time but without the addition of the mixed salt.

Samples from each of the hides so obtained were subsequently compression moulded in a steam-heated press at 180° C., producing flat sheets 0.050 inch thick.

Samples from these sheets were then placed side by side between sheets of aluminium foil and compression moulded between steel plates in an electric press at 250° C. for 15 minutes. The procedure was subsequently repeated using a moulding time of 30 minutes.

Comparisons between the six samples so obtained clearly showed that considerably more yellowing had occurred in the samples not containing the mixed salt. Furthermore, the comparisons showed that the colour of the compositions produced according to the process of the invention did not deteriorate substantially with increasing time, in marked contrast to the composition not containing the mixed salt.

EXAMPLES 44 TO 51

The procedure described in Example 43 was repeated except that "Cycolon D.M." was replaced each time by one of the following acrylonitrile/butadiene/styrene terpolymers:

"Cycolac T" having a tensile strength of 6,300 pounds per square inch and a specific gravity of 1.04;

"Cycolac SF" having a tensile strength of 2,600 pounds per square inch and a specific gravity of 1.000;

"Cycolac X7" having a tensile strength of 6,900 pounds per square inch and a specific gravity of 1.05;

"Cycolac H" having a tensile strength of 4,700 pounds per square inch and a specific gravity of 1.02;

"Blendex 401" having a tensile strength of 3,200 pounds per square inch and a specific gravity of 0.99;

"Kralastic MH" having a tensile strength of 6,200 pounds per square inch and a specific gravity of 1.04;

"Kralastic SR" having a tensile strength of 6,500 pounds per square inch and a specific gravity of 1.04; and "Kralastic K.2540" having a tensile strength of 4,400 pounds per square inch and a specific gravity of 1.01.

The tensile strength in each case being determined at 73° F. at a rate of 0.2 inch per minute according to A.S.T.M. D.638–61T, and the specific gravity being determined using a compression moulded sample.

Comparisons between the various samples so obtained clearly showed that considerably more yellowing had occurred in the samples not containing the mixed salt. Furthermore, the comparisons again showed that the colour of the compositions produced according to the process of the invention did not deteriorate substantially with increasing time, in marked contrast to compositions not containing the mixed salt.

EXAMPLES 52 TO 54

The procedure described in Example 43 was repeated except that the calcium di-sodium ethylenediamine tetra-acetate used therein was replaced by di-sodium salt of ethylenediamine tetra-acetic acid, tetra-sodium ethylenediamine tetra-acetate and penta-sodium diethylenetriamine penta-acetate respectively.

For the purposes of comparisons, milled hides were produced from "Cycolon D.M." alone, "Cycolon D.M." containing ethylenediamine tetra-acetic acid, diethylenetriamine penta-acetic acid and tri-iso-decyl phosphite, a recognised heat stabiliser.

Mouldings were then produced from each of the milled hides according to the procedure described in Example 1.

Comparisons between the respective mouldings clearly showed that severe yellowing had occurred in the moulding produced from the resin containing no additive, and in those produced from the resins containing ethylenediamine tetra-acetic acid, diethylenetriamine penta-acetic acid and tri-isodecyl phosphite. In contradistinction little deterioration was observed in the mouldings produced from resins containing the di- and tetra-sodium salts of ethylenediamine tetra-acetic acid or containing penta-sodium diethylenetriamine penta-acetate. Moreover, the colour of the compositions produced according to the present invention did not deteriorate with increasing time, in contrast to the comparative compositions.

EXAMPLES 55 AND 56

100 parts of a raw polybutadiene rubber were cold milled with 1.0 part of tris nonylated triphenyl phosphite on a two-roll mill. Two further samples of polybutadiene rubber were prepared in the same way from using 100 parts of polybutadiene, 1.0 part of tris nonylated triphenyl phosphite and 1.0 part of sodium tetraborate and 100 parts of polybutadiene, 1.0 part of tri nonyl phenyl phosphite and 1.0 part of sodium pyrophosphate respectively.

1 inch square samples were cut from each of the milled sheets and heat-aged in an oven at 150° C. The colour of the heat-aged samples was noted initially and after two hours ageing, the results being shown in Table X.

The compositions prepared according to the present invention performed appreciably better than the untreated sample and a composition outside the scope of this invention.

EXAMPLES 57 TO 61

100 parts of a grade of polystyrene having a tensile strength at 73° F. and a straining rate of 0.2 inch per minute within the range of from 4,500 to 6,000 pounds per square inch and a specific gravity of from 1.04 to 1.06 were milled at 165° C. with each of the following additives or combinations of additives on a two-roll mill:

(a) 1.0 part of tri nonyl phenyl phosphite
(b) 1.0 part of sodium tetraborate
(c) 1.0 part of disodium iminodiacetic acid and 1.0 part of tri nonyl phenyl phosphite
(d) 1.0 part of the tetrasodium salt of the tetracarboxylic acid from oxidised Bisphenol A and 1.0 part of tri nonyl phenyl phosphite
(e) 1.0 part of sodium pyrophosphate and 1.0 part of tri nonyl phenyl phosphite
(f) 1.0 part of sodium tetraborate and 1.0 part of tri nonyl phenyl phosphite.

Samples of each of the hides so obtained were subsequently compression moulded in a steam-heated press at 180° C., to produce flat sheets 0.050 inch thick.

1.0 inch square samples were cut from each of the moulded sheets and heat-aged in an oven at 150° C. The colour of the samples was noted initially and after 16 hours ageing, the results being shown in the following Table XI:

TABLE XI

| Ex. | Additive | pK value of acid radical | Colour of sample Initial | Colour of sample After 16 hours |
|---|---|---|---|---|
| | None | | 0 | 5 |
| | Trinonyl phenyl phosphite | | 0 | 8 |
| 57 | Sodium tetraborate | 9.0 | 0 | 4 |
| 58 | Disodium iminodiacetic acid plus trinonyl phenyl phosphite | 9.2 | 0 | 4 |
| 59 | Tetrasodium salt of oxidation product of bisphenol A plus trinonyl phenyl phosphite | 6.0 | 0 | 2 |
| 60 | Sodium pyrophosphate plus trinonyl phenyl phosphite | 8.2 | 0 | 3 |
| 61 | Sodium tetraborate plus trinonyl phenyl phosphite | 9.0 | 0 | 3 |

Appreciable improvement in the heat ageing properties of the polystyrene material treated according to the process of the invention was noted compared with the untreated material and with material containing a conventional heat stabiliser. In addition synergistic effects are noted when the polystyrene material was treated both with a salt according to the present invention and with a known stabiliser.

EXAMPLES 62 AND 63

100 parts of a styrene/acrylonitrile copolymer having a tensile strength at 73° F. and a straining rate of 0.2 inch per minute at 9,000 pounds per square inch and a specific gravity of 1.08 were milled at 165° C. with each of the following additives or combinations of additives on a two-roll mill:

(a) 1.0 part of tri nonyl phenyl phosphite
(b) 1.0 part of disodium iminodiacetate
(c) 1.0 part of disodium iminodiacetic acid and 1.0 part of tri nonyl phenyl phosphite.

Samples of each of the hides so obtained were subsequently compression moulded in a steam-heated press at 180° C., to produce flat sheets 0.050 inch thick.

1.0 inch square samples were cut from each of the moulded sheets and heat-aged in an oven at 150° C. The colour of the samples was noted initially and after 16 hours ageing. The results are shown in the following Table XII:

TABLE X

| | Additive | pK value of acid radical | Colour of sample Initial | Colour of sample After 2 hours |
|---|---|---|---|---|
| Example: | None | | 1 | 3 |
| | Trinonyl phenyl phosphite | | 1 | 3 |
| 55 | Trinonyl phenyl phosphite and sodium tetraborate | 9.0 | 1 | 2 |
| 56 | Trinonyl phenyl phosphite and sodium pyrophosphate | 8.2 | 1 | 2 |

TABLE XII

| | Additive | pK value of acid radical | Colour of sample Initial | Colour of sample After 16 hours |
|---|---|---|---|---|
| Example: | None | | 0 | 10 |
| | Trinonyl phenyl phosphite | | 0 | 10 |
| 62 | Disodium iminodiacetate | 9.2 | 0 | 8 |
| 63 | Disodium iminodiacetate plus trinonyl phenyl phosphite | 9.2 | 0 | 8 |

Appreciable superiority as to colour stability in the compositions prepared according to the process of the present invention was again observed.

moulded sheets and heat-aged in an oven at 150° C. The colour of the samples was noted initially and after 8 hours ageing. The results are shown in Table XIII:

TABLE XIII

| Ex. | Additive | pK value of acid radical | Colour of sample | |
|---|---|---|---|---|
| | | | Initial | After 8 hours |
| | None | | 1 | 7 |
| | Trinonyl phenyl phosphite | | 1 | 10 |
| 64 | Tetrasodium salt of oxidation product of bisphenol A plus trinonyl phenyl phosphite | 6.0 | 1 | 6 |
| 65 | Sodium pyrophosphate plus trinonyl phenyl phosphite | 8.2 | 1 | 6 |
| 66 | Sodium tetraborate plus trinonyl phenyl phosphite | 9.0 | 1 | 5 |

EXAMPLES 64 TO 66

100 parts of a grade of high impact polystyrene having a tensile strength at 73° F. and a straining rate of 0.2 inch per minute within the range of from 3,000 to 4,000 pounds per square inch and a specific gravity of from 1.04 to 1.06 were milled at 165° C. with each of the following additives or combinations of additives on a two-roll mill:

(a) 1.0 part of tri nonyl phenyl phosphite
(b) 1.0 part of the tetrasodium salt of the oxidation product of Bisphenol A and 1.0 part of tri nonyl phenyl phosphite
(c) 1.0 part of sodium pyrophosphate and 1.0 part of tri nonyl phenyl phosphite
(d) 1.0 part of sodium tetraborate and 1.0 part of tri nonyl phenyl phosphite Samples of each of the hides so obtained were subsequently compression moulded in a steam-heated press at 180° C., to produce flat sheets 0.050 inch thick.

1.0 inch square samples were cut from each of the

EXAMPLES 67 TO 70

100 parts of stabilised "Cycolac T" and 1.0 part of one of each of the following salts were blended and moulded as described in Example 1:

disodium iminodiacetate
trisodium nitrilotriacetate
sodium glutamate
tri-sodium hydroxyethyl ethylenediamine triacetate The test data obtained are set out in the following Table XIV:

TABLE XIV

| | | pK value of acid radical | Flow | | Colour | |
|---|---|---|---|---|---|---|
| | Additive | | Initial | After ageing | Initial | After ageing |
| Example: | | | | | | |
| | None | | 0.97 | 0.11 | 1 | 8 |
| 67 | Disodium iminodiacetate | 9.2 | 1.55 | 1.40 | 1 | 3 |
| 68 | Trisodium nitrilotriacetate | 10.7 | 1.68 | 0.96 | 1 | 4 |
| 69 | Sodium glutamate | 4.1 | 1.70 | 1.16 | 1 | 5 |
| 70 | Trisodium hydroxyethyl ethylenediamine triacetate | 9.7 | 1.38 | 0.69 | 1 | 4 |

The compositions produced according to the process of the present invention are considerably superior with respect to both flow and colour stability properties compared with the untreated material.

EXAMPLES 71 TO 81

100 parts of unstabilised "Cycolac T" were blended and moulded with various additives in various concentrations as set out in the following Table XV according to the procedure set forth in Example 1.

The test data obtained for the various compositions is also shown in Table XV.

TABLE XV

| Ex. | Additive | Proportion of additive, percent by weight | Flow | | Colour | |
|---|---|---|---|---|---|---|
| | | | Initial | After ageing | Initial | After ageing |
| | None | | 1.0 | 0.23 | 1 | 8 |
| | Trinonyl phenyl phosphite | 0.5 | 1.14 | 0.19 | 1 | 8 |
| 71 | Sodium o-silicate | 1.0 | 1.14 | 0.96 | 1 | 5 |
| 72 | Tetrasodium ethylenediamine tetra acetate | 1.0 | 1.07 | 0.73 | 1 | 5 |
| 73 | Trinonyl phenyl phosphite / Sodium o-silicate | 0.5 / 1.0 | 1.35 | 0.90 | 1 | 3 |
| 74 | Trinonyl phenyl phosphite / Tetrasodium ethylenediamine tetra acetate | 0.5 / 1.0 | 1.49 | 1.22 | 1 | 3 |
| 75 | Trinonyl phenyl phosphite / Sodium o-silicate / Tetrasodium ethylenediamine tetra acetate | 0.5 / 0.5 / 0.5 | 1.46 | 1.04 | 1 | 4 |
| 76 | Trinonyl phenyl phosphite / Sodium o-silicate / Tetrasodium ethylenediamine tetra acetate | 0.2 / 0.2 / 0.2 | 1.32 | 0.87 | 1 | 5 |
| 77 | Trinonyl phenyl phosphite / Sodium o-silicate / Tetrasodium ethylenediamine tetra acetate | 0.1 / 0.1 / 0.1 | 1.19 | 0.47 | 1 | 4 |
| 78 | Trinonyl phenyl phosphite / Sodium o-silicate / Tetrasodium ethylenediamine tetra acetate | 0.05 / 0.05 / 0.05 | 1.38 | 0.19 | 1 | 7 |
| | Dilauryl thiodipropionate | 0.5 | 1.40 | 0.27 | 1 | 8 |
| 79 | Dilauryl thiodipropionate / Sodium o-silicate / Tetrasodium ethylenediamine tetra acetate | 0.2 / 0.2 / 0.2 | 1.56 | 0.80 | 1 | 3 |
| 80 | Dilauryl thiodipropionate / Sodium o-silicate | 0.5 / 1.0 | 1.68 | 1.57 | 1 | 4 |
| 81 | Dilauryl thiodipropionate / Tetrasodium ethylenediamine tetra acetate | 0.5 / 1.0 | 1.23 | 0.69 | 1 | 4 |

The results in Table XV emphasise once more the excellent flow and colour stability properties of the compositions produced according to the process of this invention.

In addition a comparison of the results obtained in Examples 73 to 78 and in Examples 79 to 81 shows clearly that the properties, especially the flow properties, of the respective compositions improve as the amount of salt additive is increased.

We claim:

1. A composition comprising a terpolymer of acrylonitrile, butadiene and styrene, and a minor amount, as stabilizer, of a sodium, potassium or calcium salt of an acid selected from the group consisting of metaboric, tetraboric, orthophosphoric, pyrophosphoric, silicic, phthalic, sebacic, citric, maleic, glycollic, salicylic, and 4,6-dicarboxymethyl-5,5-dimethylazelaic acids, whereby the colour stability and/or the rheological properties of the polymer are improved.

2. A composition as defined in claim 1, wherein the amount of said stabiliser ranges from about 0.05% to 5% calculated on the weight of the polymer.

3. A composition as defined in claim 2, wherein said terpolymer has a tensile strength in the range of from about 2600 to 6900 pounds per square inch and a specific gravity of from about 1.01 to 1.05.

4. A composition as defined in claim 2, further comprising a minor portion of a tri-aryl phosphite.

5. A composition as defined in claim 4, wherein the amount of said tri-aryl phosphite ranges from about 0.1 to 5% based on the weight of the polymer.

6. A composition as defined in claim 5, wherein said tri-aryl phosphite is triphenyl phosphite.

7. A composition as defined in claim 5, wherein said tri-aryl phosphite is trinonylphenyl phosphite.

8. A composition comprising (1) at least one of the following polymers: polybutadiene, polystyrene, a co- or terpolymer of acrylonitrile, butadiene and styrene, and (2) a minor amount, as stabilizer, of an alkali metal tetraborate, whereby the colour stability and/or the rheological properties of the polymer are improved.

References Cited

UNITED STATES PATENTS

| | | | |
|---|---|---|---|
| 2,477,657 | 8/1949 | Schaefer | 260—45.85 |
| 2,493,390 | 1/1950 | Chaban | 260—45.7 |
| 2,507,142 | 5/1950 | Chaban | 260—45.7 |
| 2,578,653 | 12/1951 | Goppel | 260—45.85 |
| 2,617,784 | 11/1952 | Slocombe | 260—45.85 |
| 2,661,345 | 12/1953 | Slocombe | 260—45.7 |
| 2,667,522 | 1/1954 | McElroy | 260—45.85 |
| 2,733,226 | 1/1956 | Hunter | 260—45.7 |
| 2,775,575 | 12/1956 | Slocombe | 260—45.85 |
| 2,784,172 | 3/1957 | Slocombe | 260—45.85 |
| 2,792,380 | 5/1957 | Slocombe | 260—45.85 |
| 3,228,904 | 1/1966 | Morris et al. | 260—45.85 |
| 3,267,069 | 8/1966 | Cummings | 260—45.75 |
| 3,244,662 | 4/1966 | Strauss | 260—29.7 |
| 3,442,981 | 5/1969 | Stafford | 260—880 |

DONALD E. CZAJA, Primary Examiner

V. P. HOKE, Assistant Examiner

U.S. Cl. X.R.

260—45.85, 45.95, 881